June 8, 1965 P. D. PRIZLER 3,187,899
FILTER STRUCTURE AND ELEMENT THEREFOR
Filed May 16, 1961 2 Sheets-Sheet 1

INVENTOR.
PAUL D. PRIZLER
BY
Flam and Flam
ATTORNEYS.

June 8, 1965  P. D. PRIZLER  3,187,899
FILTER STRUCTURE AND ELEMENT THEREFOR
Filed May 16, 1961  2 Sheets-Sheet 2
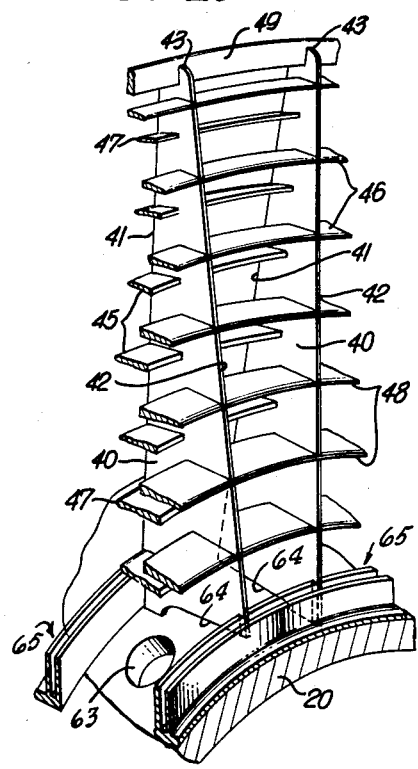
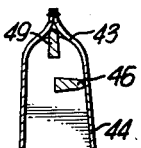
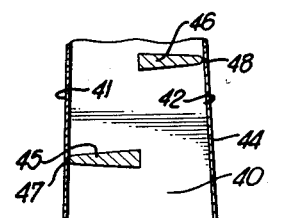
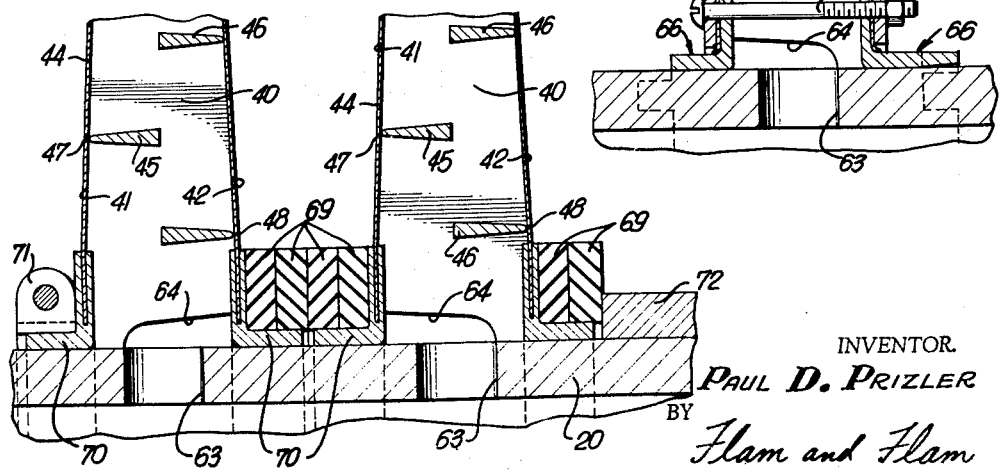
INVENTOR.
PAUL D. PRIZLER
BY Flam and Flam
ATTORNEYS.

United States Patent Office 3,187,899
Patented June 8, 1965

3,187,899
FILTER STRUCTURE AND ELEMENT THEREFOR
Paul D. Prizler, Temple City, Calif., assignor to Swimquip, Inc., El Monte, Calif., a corporation of California
Filed May 16, 1961, Ser. No. 110,390
7 Claims. (Cl. 210—487)

This invention relates to a filter structure, and particularly to a filter element and an assembly utilizing a plurality of elements placed upon a collection tube in order to provide a multiplication filtering area.

A desirable filter structure is one that provides, in essence, a hollow cage-like core upon which a septum is supported. Filtered water entering the cage passes freely to the collection point and thence to a collection tube communicating with the inside of the cage. Greater resistance to flow is encountered in the less desirable organization where a plate-type septum support is provided. In the organization having a central plate, lateral projections on opposite sides of the plate hold the septum against bottoming. Two separate chambers on opposite sides of the plate are thus formed. The plate is responsible for the substantial resistance to the flow of liquid toward the collection tube. The plate can be molded in one piece, however.

An object of the present invention is to provide a one-piece moldable filter core of cage form. For this purpose, the main structural members of the core are provided by a series of thin arms arrayed in spaced planes that are all substantially perpendicular to the opposite sides of the filter element. In the present example, the arms radiate from a common axis in order to fit the collection tube. The longitudinal edges of the arms provide limited area engagement with opposite sides of the filter element septum. The segmental spaces between the arms form individual collection channels leading to the collection tube. A first series of arcuate webs extend inwardly from one side of the filter element. A second series of arcuate webs also connect the adjacent arms, but extend inwardly from the opposite side of the filter elements. The webs further support the septum. A staggered relationship of the webs on one side relative to the webs on the other side makes possible a single mold structure. Despite the simplified mold structure, a sinuous, yet central flow path is provided past the webs. In practice the individual webs may be circularly arrayed for simplicity sake. Further to ensure unit molding of the core, the usual spacer hubs are provided separately.

Another object of this invention is to provide minimum impedance to the flow of water at the central collection tube. For this the core has no hub as such, but instead the end edges of the radiating arms rest upon the collection tube. Relieved portions of these end edges provide communication between the flow spaces and ensure against accidental blockage of the openings to the collection tube.

Another object of this invention is to provide a new filter element in which a separate spacer is expeditiously carried by the septum or otherwise attached to the element.

Another object of this invention is to provide an improved filter element for use in a filter structure of the spin type, that is, one in which rapid rotation of the filter element serves to dislodge the deposited material whereby the filter elements are conditioned for renewed operation. To accomplish this purpose, each hub is splined or toothed, whereby a coupling is established with the hub of adjacent elements. In addition, a special driving member that rotates the collection tube also has teeth to engage the hub of the end filter element, thereby ensuring against slippage.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 2 is a pictorial view illustrating a fragment of the filter core and the collection tube;

FIG. 3 is an enlarged fragmentary axial sectional view showing a portion of the apparatus of FIG. 1; and FIGS. 4 and 5 are fragmentary axial sectional views similar to FIG. 3 but illustrating modified septum and hub structures.

Figure 1:
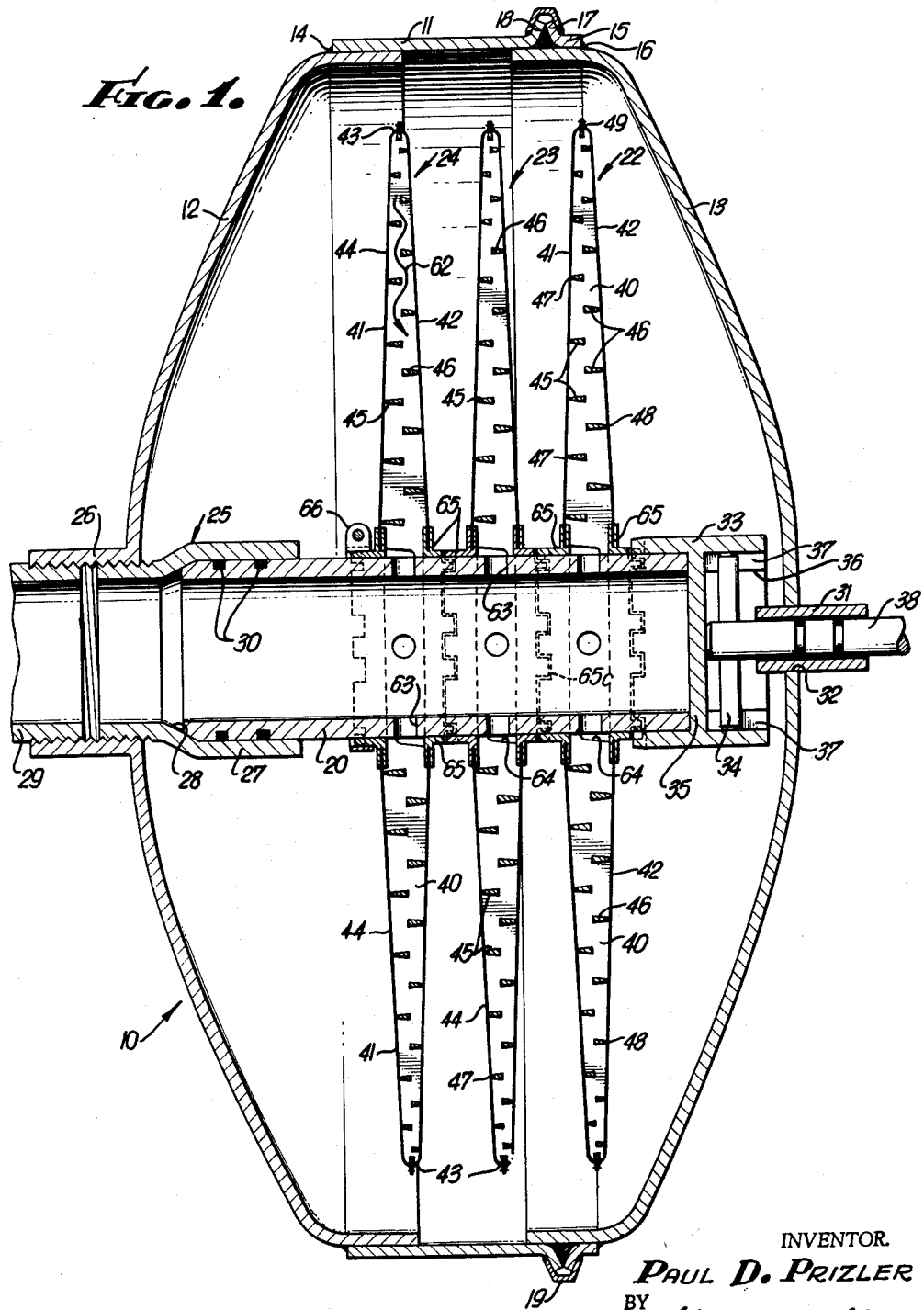
FIGURE 1 is an axial sectional view of a filter structure incorporating the present invention.

In FIG. 1 there is illustrated a filter tank 10 that may be made of plastic or other suitable material. The tank in the present example is formed by a cylindrical wall 11 of any desired axial dimension, and two end members 12 and 13. The end members 12 and 13 have peripheral flanges fitting within opposite ends of the cylindrical wall 11. The end member 12 is welded to the wall 11, as at 14 to form a bottom for the tank, but the end member 13 is detachable to form a removable cover for the tank 10.

An annular band 15 circumscribes the cover member 13 and is welded thereto, as at 16. The band 15 provides an inclined rim 17 that opposes an inclined rim 18 formed about the end opening of the cylindrical wall member 11. A conventional clamping band 19 constricts the rims 17 and 18 about an O-ring, thereby securing the cover and sealing the tank.

A tubular collection tube 20, which may be made of plastic, is mounted within the tank 10 and extends along the tank axis. The length of the tube 20 conforms to the length of the tank 10. Upon this collection tube filter elements 22, 23 and 24, to be hereinafter described, are mounted. The left hand end of the collection tube 20 as viewed in FIG. 1 is mounted by a fitting 25 in turn attached to the inside of the end member 12. An integral cylindrical interiorly screw-threaded connector 26 projects outwardly from the bottom member 12, opposite ends being accessible from opposite sides of the member 12. The other end of the fitting 25 is flared outwardly to provide a cylindrical socket 27 receiving the collection tube 20. A frusto-conical seat 28 formed at the base of the flared portion of the fitting 25 may be engaged by the beveled end of the collection tube 20. O-rings 30, made of rubber or the like, carried by the collection tube, provide a suitable seal.

An effluent conduit 29 is attached to the outer end of connector 26. An influent conduit (not shown) is attached to a fitting, also preferably carried by the end member 12.

The right and end of the collection tube 20 carries a coupling member 33 that is generally cylindrical, and made of plastic or other suitable material. A central partition 35 defines the bottom of a socket in which the end of the collection tube 20 is received. The coupling member 33 and tube 20 are welded or secured together. The partition 35 seals the end of the collection tube 20.

The outer end of the coupling member 33 has a circular recess 36 at diametrically disposed portions of which are provided axially extending grooves 37 and 38 for receiving the ends of a driving pin 34. The driving pin 34 is mounted at the inner end of a crank shaft 38 that in turn is supported in a bearing bushing 31 carried by the cover member 13. The tube 20 is thus supported for rotation.

Upon removal of the cover member 13, the driving pin 34 separates from the coupling member 33. The collection tube 20, together with the filter elements 22, 23 and 24 can then be removed from the fitting socket 27. A crank handle attached to the crank shaft 38 serves as a means for rotating the collection tube 20, the driving member 33 and, in a manner to be hereinafter described, the filter elements 22, 23 and 24. The O-rings 30 allow rotation of the parts 25 and 20.

The filter elements 22, 23 and 24 are identical, and a description of one suffices as a description of all.

Each filter element includes a unitary moldable core comprising arms, webs and a peripheral rim. The arms 40 are each made of a strip of material generally of uniform thickness, opposite edges 41 and 42 converging from the base end to a rounded apex 43. The arms 40 are arrayed in angularly spaced planes that all pass through a common axis. The base ends of the arms 40 are spaced from that common axis so as together fit the collection tube 20. The side edges 41 and 42 of the arms 40 form restricted contact areas for the septum 44 on opposite sides of the element, the edges on opposite sides respectively corresponding to spaced line generatrices of an imaginary conical surface. Spaces between adjacent arms 40 form collection channels for the filtered water.

In order further to support the septum 44 and structurally to integrate the arms 40, two sets of spaced webs 45 and 46 are provided between each pair of adjacent arms 40. The webs 45 and 46, like the arms 40, are thin, and oriented so that they extend in perpendicular relationship to the opposite sides of the filter element. The webs of one set 45 are located on one side of the filter element, the set 46 on the other. The outer edges 47 of the webs 45 fall at the imaginary conical surface that includes the edges 41. The outer edges 48 of the webs 46 fall at the imaginary conical surface that includes the edges 42. The septum 44 on opposite sides of the element is accordingly engaged. A radially extending rim 49 rings the apices of the arms 40 and projects outwardly therefrom to provide a restricted area of engagement at the central peripheral seam of the septum.

Each web 45 between each pair of arms 40 is, in this example, circularly contiguous with a web between the adjacent pair of arms 40 so that the webs form circles. The important relationship, however, to facilitate the molding process, is that each web is staggered relative to webs of the opposite set. An interior flow path is provided as shown by the arrow 62 in FIG. 1, all without requiring any mold inserts.

The collection tube 20 has a series of sets of peripheral apertures 63 for receiving the filtered water, one set for each filter element. To ensure against even partial blockage of the apertures 63 by the base end edges of the arms 40, as well as to ensure free communication at the center of the core, the base ends of the vanes or arms 40 have notches 64 that extend inwardly from one of the side edges. The edges from which the notches extend alternate for successive arms. Since the notches extend inwardly from the edges, the mold requires no inserts on this account. Furthermore, by virtue of the alternate arrangement of notches 64, there are two spaced rings along which the core engages the tube 20, thereby providing the requisite stability.

The septum 44 is made of two identical parts, each a circular disc of plastic fabric material. The two septum parts placed on opposite sides of the filter core are peripherally sewn or otherwise attached together.

Each septum half carries at its central aperture a hub section 65 made of plastic or other suitable material. The hub section 65 has an outwardly extending cylindrical portion 65a fitting the collection tube 20 and a radial flange portion 65b molded about the septum for attachment thereto. The edge at the outer end of the cylindrical portion 65a is notched or toothed as at 65c and fits the correspondingly notched or toothed end surface of the hub section of the next filter element, thereby providing a positive coupling for purposes presently to appear.

The radial portion 65b backs against the corresponding edge 41 or 42 of the filter core arms 40.

A stack of filter elements 22, 23 and 24 thus coupled upon the collection tube 20 as shown in FIG. 1, are driven by the coupling member 33. For this purpose, the end surface of the coupling member 33 is also notched or toothed to engage the opposing hub section 65 of the end element 22. The hub section at the other end element 24 is secured to the collection tube 20 by a conventional hose clamp 86. The arrangement insures against slippage of the elements.

In the form illustrated in FIG. 4, the inner margins of the septum 44, instead of being molded to a hub section, are held against the radial flange portions 66b of a hub section 66 by the aid of a clamping ring 67. The clamping rings on opposite sides of each element are conveniently urged together by the aid of machine screws 68 passing through the core structure.

The end edges of the hub 66, as before, are toothed or notched for interengagement.

In the form shown in FIG. 5, resilient friction rings 69 fit about hubs 70 and provide a frictional coupling between adjacent elements. In order to ensure adequate frictional force, axial compression is applied to the stack of filter elements. A hose clamp 71 at one end maintains the axial compression, the friction ring 69 at the other end engaging a coupling member 72.

The inventor claims:

1. A moldable unitary filter element core having a plurality of arms arrayed in planes that are angularly spaced about a common axis, each of the arms having a base end, and sides defining sides of the element core, the base ends of the arms being spaced from the said axis to fit a collection tube or the like, two sets of webs extending between, and transverse to, adjacent ones of said arms, each of said sets comprising a plurality of webs spaced apart from each other at successively greater distance from the collection tube, one of the sets of webs joining the arms along corresponding first sides of said arms, and the second set of webs joining the arms along the other corresponding sides of said arms, the webs of each set being staggered relative to webs of the opposite set, and each web extending only partially in a direction from said to side of the core to define an interior sinuous flow path over the inner edges of the webs for filtered liquid in a general radial direction toward the base ends of said arms.

2. The combination comprising the filter element core set forth in claim 1 together with a septum enclosing and supported by said core, and hub sections separate from said core and attached to said septum.

3. A moldable unitary filter element core having a series of arms arrayed in planes that are angularly spaced about a common axis, each of the arms having a base end, and sides defining sides of the element core, the base ends of the arms being spaced from each other and spaced from the said axis to fit a collection tube or the like, two sets of webs extending between, and transverse to, adjacent ones of said arms, each of said sets comprising a plurality of webs spaced apart from each other at successively greater distances from the collection tube, one of the sets of webs joining the arms along corresponding first sides of said arms, and the second set of webs joining the arms along the other corresponding sides of said arms, the webs of each set being staggered relative to webs of the opposite set, and each web extending only partially in a direction from side to side of the core to define an interior sinuous flow path over the inner edges of the webs for filtered liquid in a general radial direction toward the base ends of said arms, the webs all being spaced from the base ends of the arms, and the base ends of the arms except for said webs being unconnected.

4. A moldable unitary filter element core having a series of arms arrayed in planes that are angularly spaced about a common axis, each of the arms having a base end and a notch extending along the base end from one side of the correpsonding arm toward the other side, the sides of the arms from which the notches extend alternating from arm to arm, and sides defining sides of the element core, the base ends of the arm being spaced from each other and spaced from the said aris to fit a collection tube or the like, two sets of webs extending between, and transverse to, adjacent ones of said arms, each of said sets comprising a plurality of webs spaced apart from each other at successively greater distances from the collection tube, one of the sets of webs joining the arms along corresponding first sides of said arms, and the second set of webs joining the arms along the other corresponding sides of said arms, the webs of each set being staggered relative to webs of the opposite set, and each web extending only partially in a direction from side to side of the core to define an interior sinuous flow path over the inner edges of the webs for filtered liquid in a general radial direction toward the base ends of said arms, the webs all being spaced from the base ends of the arms, and the bast ends of the arms except for said webs being unconnected.

5. A moldable unitary filter element core having a plurality of thin arms arrayed in angularly spaced planes all radiating from a common axis, each of the arms having a base end and sides defining sides of the element core, the base ends being equally spaced from said axis to fit a cylindrical collection tube; a plurality of sets of webs, each web being arrayed circularly about said axis, each of said sets comprising a plurality of webs spaced apart from each other at successively greater distances from the collection tube, the alternate webs of a first set inter-connecting the arms along corresponding first arm sides; the alternate webs of a second set interconnecting the arms along the other corresponding arm sides; the webs of the first set being located at distances from said axis different from the distance from said axis of any of the webs of the second set; the webs extending only partially in a direction from side to side of the core to define an interior flow path for filtered liquid over the inner edges of the webs in the general direction toward the axis.

6. The combination comprising the filter element core set forth in claim 5 together with a septum enclosing and supported by said core, and hub sections separate from said core and attached to said septum.

7. A filter element comprising a plurality of arms extending radially around a longitudinal axis and angularly spaced apart from each other, each of said arms being a substantially flat member having opposite sides which diverge away from each other from the point of greatest radius of the arm toward the longitudinal axis, two sets of spaced webs attached to the arms and arranged concentrically around the axis, each of said sets comprising a plurality of webs spaced apart from each other at successively greater distance from the axis, the individual webs being of different diameters from each other so that they are spaced apart from each other, the outer edges of the webs of one set of webs joining a first of the edges of all the arms and extending toward, but not as far as the second edges of the arms, thereby forming inner edges of the respective webs of said one set, and the outer edges of the webs of the second set of webs joining second edges of the arms and extending toward, but not as far as, the first edges of the arms, thereby forming inner edges of the respective webs of said second set, the webs of the two sets overlapping each other at their inner edges, and a septum mounted on and covering the arms and defining a chamber within the septum so that fluid passing through the septum into the chamber can flow radially between adjacent arms and in a sinuous manner past the edges of the webs within the chamber.

References Cited by the Examiner
UNITED STATES PATENTS

| 1,887,798 | 11/32 | Bryant | 210—331 |
| 2,593,707 | 4/52 | Walker | 210—331 X |
| 3,019,905 | 2/62 | Baker | 210—331 |

FOREIGN PATENTS

| 846,246 | 8/52 | Germany. |
| 617,677 | 2/49 | Great Britain. |
| 655,385 | 7/51 | Great Britain. |

REUBEN FRIEDMAN, *Primary Examiner.*

HERBERT L. MARTIN, *Examiner.*